Figure 1:
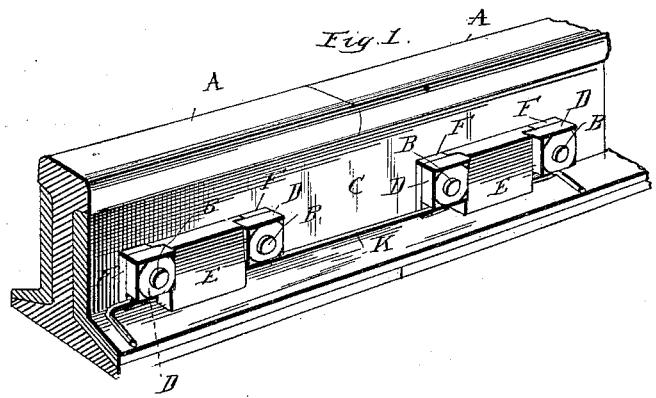

(No Model.)

D. STEINER.
NUT LOCK.

No. 411,306. Patented Sept. 17, 1889.

Witnesses

Inventor
David Steiner
By his Attorneys

United States Patent Office.

DAVID STEINER, OF ADAMSBURG, PENNSYLVANIA.

NUT-LOCK.

SPECIFICATION forming part of Letters Patent No. 411,306, dated September 17, 1889.

Application filed March 21, 1889. Serial No. 304,112. (No model.)

*To all whom it may concern:*

Be it known that I, DAVID STEINER, a citizen of the United States, residing at Adamsburg, in the county of Westmoreland and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to provisions for locking nuts and bolts, and has for its object the production of simple and convenient means for readily and quickly locking and unlocking a pair of bolts or nuts.

The improvement consists in having combined with a pair of nuts a locking-slide, which is slipped in between the two nuts and is held in place against lateral displacement by an overlapping portion of the said nuts and against vertical dislodgment by a locking-bolt.

The improvement further consists in the novel features now to be described, claimed, and shown in the drawings, in which—

Figure 2:
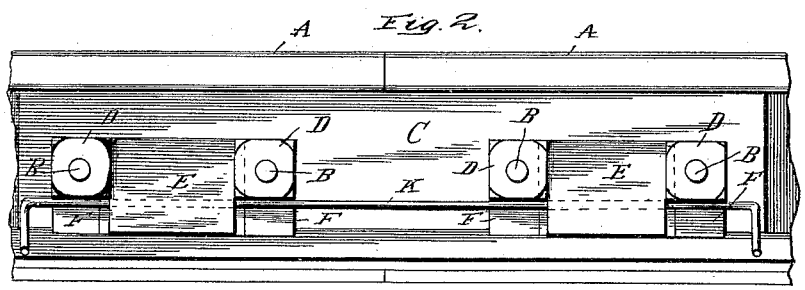
Figure 3:
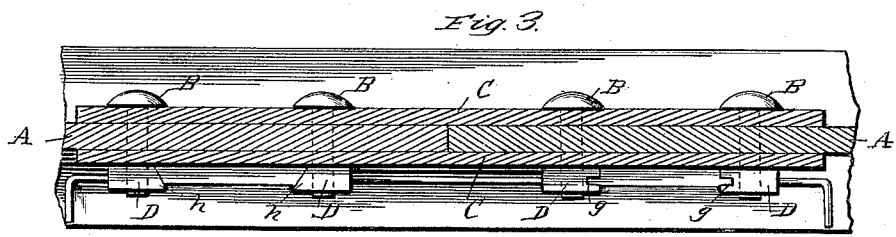
Figure 4:
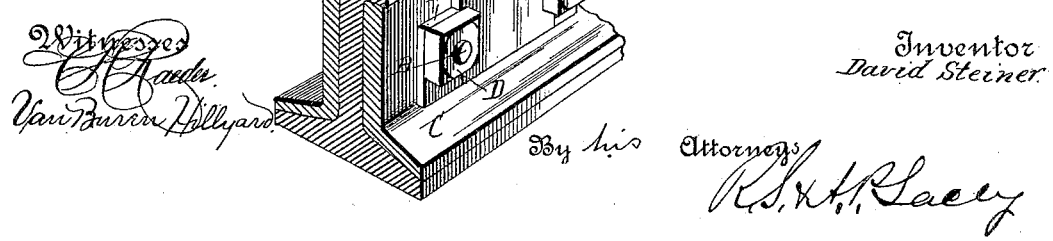

Figure 1 is a perspective view of the rail-joint embodying my invention; Fig. 2, a side view; Fig. 3, a horizontal longitudinal section showing modifications; Fig. 4, a side view showing the means for holding the washers from displacement when turning the nuts.

In the drawings, I have shown the invention applied to a rail-joint; but I do not wish to be restricted to its application in this respect, as it may be put to a general use.

A and A' are two sections of rails; C, the fish-plate; B, the bolts; and D, the nuts, which have overlapping portions to engage with the locking-slides E and hold then from lateral displacement.

In Fig. 1 washers F are placed between the nuts and the fish-plate. The inner edges of these washers F do not come flush with the inner edges of the nuts, thereby leaving a portion thereof projecting, which projecting portions overlap the edges of the locking-slides and hold them from lateral displacement, as most clearly shown in Fig. 1.

In Fig. 2 the left-hand pair of nuts have their opposing edges grooved, and these grooves $g$ receive corresponding tongues on the edges of the locking-slide. The right-hand pair of nuts in the same figure have their opposing edges undercut, and the edges of the locking-slide are correspondingly shaped to fit under the overlapping portions $h$ of the said nuts.

The locking-bolt K passes beneath the nuts and engages with the locking-slides, preferably by passing through openings therein, to hold them down. The ends of the locking-bolt are bent, to prevent it slipping out.

Referring to Fig. 4, it will be seen that the washers are held in place when screwing home the nuts by the plate M, which is inserted between them. When the nuts are screwed up tight, the plate M is removed and replaced by the locking-plate.

Having thus described my invention, what I claim, and desire to secure by Letters Patent, is—

The combination, with a pair of nuts and a locking-slide placed between the nuts and held from lateral displacement thereby, of a locking-bolt passed beneath the said nuts and engaging with the locking-slide, substantially as and for the purpose described.

In testimony whereof I affix my signature in presence of two witnesses.

DAVID STEINER.

Witnesses:
 D. C. MORRIS,
 STOUT BOOTH.